(12) United States Patent
Hottinen (10) Patent No.: US 7,613,233 B2
(45) Date of Patent: Nov. 3, 2009

(54) METHOD AND CONTROLLER FOR CONTROLLING COMMUNICATION RESOURCES

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 904 days.

(21) Appl. No.: 10/689,850

(22) Filed: Oct. 22, 2003

(65) Prior Publication Data

US 2005/0013352 A1  Jan. 20, 2005

(30) Foreign Application Priority Data

Jul. 16, 2003  (FI) .................................. 20031079

(51) Int. Cl.
*H04B 1/38*  (2006.01)
(52) U.S. Cl. ..................................... 375/219
(58) Field of Classification Search ................ 375/219, 375/220; 370/208, 219, 252, 260, 364
See application file for complete search history.

(56) References Cited

U.S. PATENT DOCUMENTS

| | | | |
|---|---|---|---|
| 6,167,031 A | 12/2000 | Olofsson et al. | |
| 6,185,258 B1 | 2/2001 | Alamouti et al. | |
| 6,411,817 B1 * | 6/2002 | Cheng et al. ................. | 455/522 |
| 6,741,640 B1 * | 5/2004 | Johnson ....................... | 375/219 |
| 2002/0126648 A1 * | 9/2002 | Kuchi et al. .................. | 370/347 |
| 2003/0048856 A1 | 3/2003 | Ketchum et al. | |
| 2003/0095508 A1 | 5/2003 | Kadous et al. | |
| 2004/0202134 A1 * | 10/2004 | Khawand ..................... | 370/332 |
| 2007/0109954 A1 * | 5/2007 | Pasanen et al. .............. | 370/204 |

OTHER PUBLICATIONS

"Complex Space-Time Block Codes for Four Tx Antennas," Olav Tirkkonen and Ari Hottinen, Nokia Research Center, Finland, © 2000 IEEE.
"Minimal Non-Orthogonality Rate 1 Space-Time Block Code for 3+ Tx Antennas," Olav Tirkonnen, Adrian Boariu, Ari Hottinen, IEEE 6$^{th}$ Int. Symp. On Spread-Spectrum Tech. & Appli., NJIT, New Jersey, USA, Sep. 6-8, 2000.
Official communication issued in the corresponding Japanese Application No. 2006-519943, mailed on Oct. 27, 2008.

* cited by examiner

*Primary Examiner*—Kevin Y Kim
(74) *Attorney, Agent, or Firm*—Squire, Sanders & Dempsey L.L.P.

(57) ABSTRACT

A method, an arrangement and a controller are provided for controlling communication resources, such as spatial and temporal communication resources of a telecommunications system. A performance measure characterizing a communication channel between a first transceiver and a second transceiver is determined. The communication channel includes modulation and modulation symbols are distributed for use in at least two radiation patterns. The performance measures are sensitive to the modulation and are the basis for controlling the communication resources.

48 Claims, 4 Drawing Sheets

METHOD AND CONTROLLER FOR CONTROLLING COMMUNICATION RESOURCES

BACKGROUND OF THE INVENTION

1. Field of the Invention:

The invention relates to controlling communication resources in a telecommunications system. Particularly, but not exclusively, the invention may be applied to telecommunications systems utilizing multiple antenna transmission.

2. Description of the Related Art:

Modern high performance communications systems utilize various communication resources, such as those associated with diversity, rate, modulation, and repeat request protocols in order to improve telecommunications system throughput with a minimal increase in the transmitting power.

A conventional method to control communication resources is to characterize a radio channel between two transceivers, such as a mobile station and a base transceiver station, and base control decisions purely on the radio channel characterization.

However, radio channel characterization neglects aspects associated with modulation, wherein modulation symbols are distributed to a plurality of radiation patterns. Therefore, it is desirable to consider improvements for communication resource control.

SUMMARY OF THE INVENTION

One aspect of the invention is to provide an improved method and arrangement for controlling communication resources, the method including determining a performance measure characterizing performance of a communication channel between a first transceiver and a second transceiver, wherein the communication channel includes modulation and where modulation symbols are distributed using at least two radiation patterns. The performance measure is sensitive to the modulation. The method further includes controlling the communication resources based on the performance measure.

According to a second aspect of the invention, there is provided an arrangement for controlling communication resources of a telecommunications system, the arrangement includes a component for determining a performance measure that characterizes the performance of a communication channel between a first transceiver and a second transceiver. The communication channel includes modulation, wherein modulation symbols are distributed using at least two radiation patterns and wherein the performance measure is sensitive to the modulation. The arrangement further includes a component for controlling the communication resources based on the performance measure.

According to another aspect of the invention, there is provided a controller of a telecommunications system, the controller including a performance measure estimator for determining a performance measure for characterizing the performance of a communication channel between a first transceiver and a second transceiver. The communication channel includes modulation, wherein modulation symbols are distributed using at least two radiation patterns, and wherein the performance measure is sensitive to the modulation. The controller further includes a control unit connected to the performance measurement unit for controlling the communication resources based on the performance measure.

Further aspects and embodiments of the invention are described hereinafter.

The methods and systems of the invention provide several advantages over conventional controlling based purely on the radio channel characterization. The invention provides an improved communication channel characterization, which accounts for the effect of spatial modulation on the communication channel and, in particular, in the presence of non-orthogonal modulation. The inventive communication channel characterization enables the communication resources to be controlled such that contribution of various aspects of the transmission and reception chain on the communication channel may be accounted for when controlling the communication resources. The performance measure of the invention enables the transceivers to compare relative efficiencies of a number of alternative transmission methods, and thus to be able to select a desired transmission method.

BRIEF DESCRIPTION OF THE DRAWINGS

In the following, additional features, aspects and advantages of the invention will be described in greater detail with reference to the preferred embodiments and the accompanying drawings, in which.

DETAILED DESCRIPTION OF THE PREFERRED EMBODIMENTS

Figure 1:
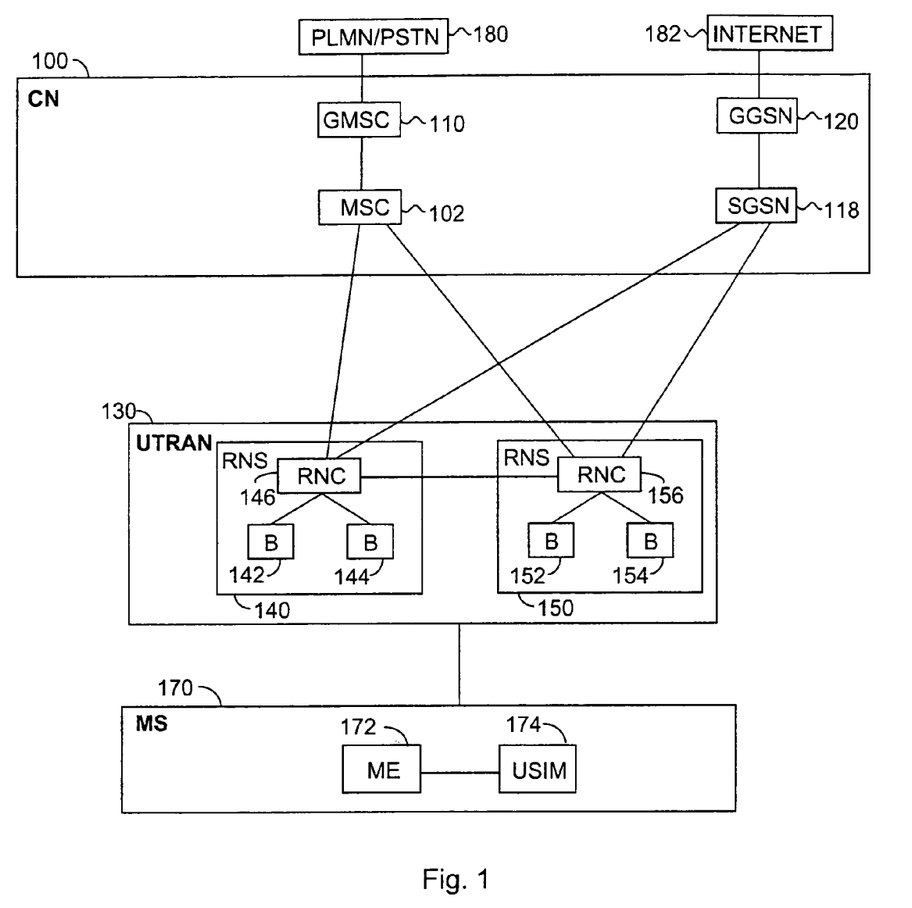
FIG. 1 shows an example of the structure of a telecommunications system according to one aspect of the invention.

FIG. 1 is a simplified block diagram showing, at a network element level, an exemplified telecommunications system. The structure and functions of the network elements are only described when relevant to the present solution.

The main parts of the exemplified telecommunications system are a core network (CN) 100, a radio access network 130 and a mobile station (MS) 170. For the sake of simplicity, a radio access network called UTRAN (UMTS Terrestrial Radio Access Network) 130 is taken as an example. UTRAN belongs to the third generation telecommunications system and is implemented by WCDMA (Wideband Code Division Multiple Access) technology. The present invention is not, however, limited to a WCDMA radio interface, but may also be applicable with MC-CDMA (Multi-Carrier Code Division Multiple Access) or OFDM (Orthogonal Frequency Division Multiplexing) technologies, or any combination thereof, for example. The invention in general may be applied to systems capable of multi-antenna transmission, such as MIMO (Multiple-Input Multiple Output) and MISO (Multiple-Input Single Output) systems.

On a general level, the telecommunications system can also be defined to include a mobile station and a network part. The mobile station is also called user equipment, a terminal, a subscriber terminal and a mobile telephone. The network part includes the fixed infrastructure of the radio system, i.e. the core network and the radio access network.

The structure of the core network 100 corresponds to a system incorporating both circuit-switched and packet-switched domains. Both domains can utilize the same radio access network 130. For simplicity, the core network 100 is presented using second generation telecommunications terminology. Corresponding structures and functionalities may be found in the third and fourth generations telecommunications system although their implementation may vary.

A mobile services switching center (MSC) 102 is the center point of the circuit-switched side of the core network 100. The mobile services switching center 102 is used to serve the connections of the radio access network 130. The tasks of the mobile services switching center 102 include: switching, paging, user equipment location registration, handover management, collection of subscriber billing information, encryption parameter management, frequency allocation management, and echo cancellation.

Large core networks 100 may have a separate gateway mobile services switching center (GMSC) 110, which is responsible for circuit-switched connections between the core network 100 and external networks 180. The gateway mobile services switching center 110 is located between the mobile services switching center 102 and the external networks 180. An external network 180 can be, for instance, a public land mobile network (PLMN) or a public switched telephone network (PSTN).

A serving GPRS support node (SGSN) 118 is the center point of the packet-switched side of the core network 100. The main task of the serving GPRS support node 118 is to transmit and receive packets together with the mobile station 170 supporting packet-switched transmission by using the radio access network 130 or the base station system. The serving GPRS support node 118 contains subscriber and location information related to the mobile station 170.

A gateway GPRS support node (GGSN) 120 is the packet-switched side counterpart to the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In this example, external networks 182 are represented by the Internet.

The radio access network 130 preferably includes radio network subsystems 140, 150. Each radio network subsystem 140, 150 includes radio network controllers (RNC) 146, 156 and nodes B 142, 144, 152, 154. Node B is an abstract term and the terms 'base transceiver station' or 'base station' are often used instead. In this example, Node B is called a base station. The base station provides the mobile station 170 with radio transmission and reception. Solutions exist where the base station 142, 144, 152, 154 is capable of implementing both TDMA (Time Division Multiple Access) and WCDMA radio interfaces simultaneously.

The implementation of the radio network controllers 146, 156 may vary. For example, where at least a portion of the functionalities of a radio network controller 146, 156 is included in the base station 142, 144, 152, 154.

The mobile station 170 provides a user of the mobile station with access to the telecommunications system. An exemplified mobile station 170 includes two parts: mobile equipment (ME) 172 and a UMTS subscriber identity module (USIM) 174. The mobile station 170 includes at least one transceiver for establishing a radio link to the radio access network 130. The mobile station 170 may further include two different subscriber identity modules. The mobile station 170 may further include other elements, such as an antenna, a user interface and a battery. Today, different types of mobile station 170 exist, for instance equipment installed in cars, and portable equipment.

The USIM 174 includes user-related information and information related to information security, such as an encryption algorithm.

Figure 2:
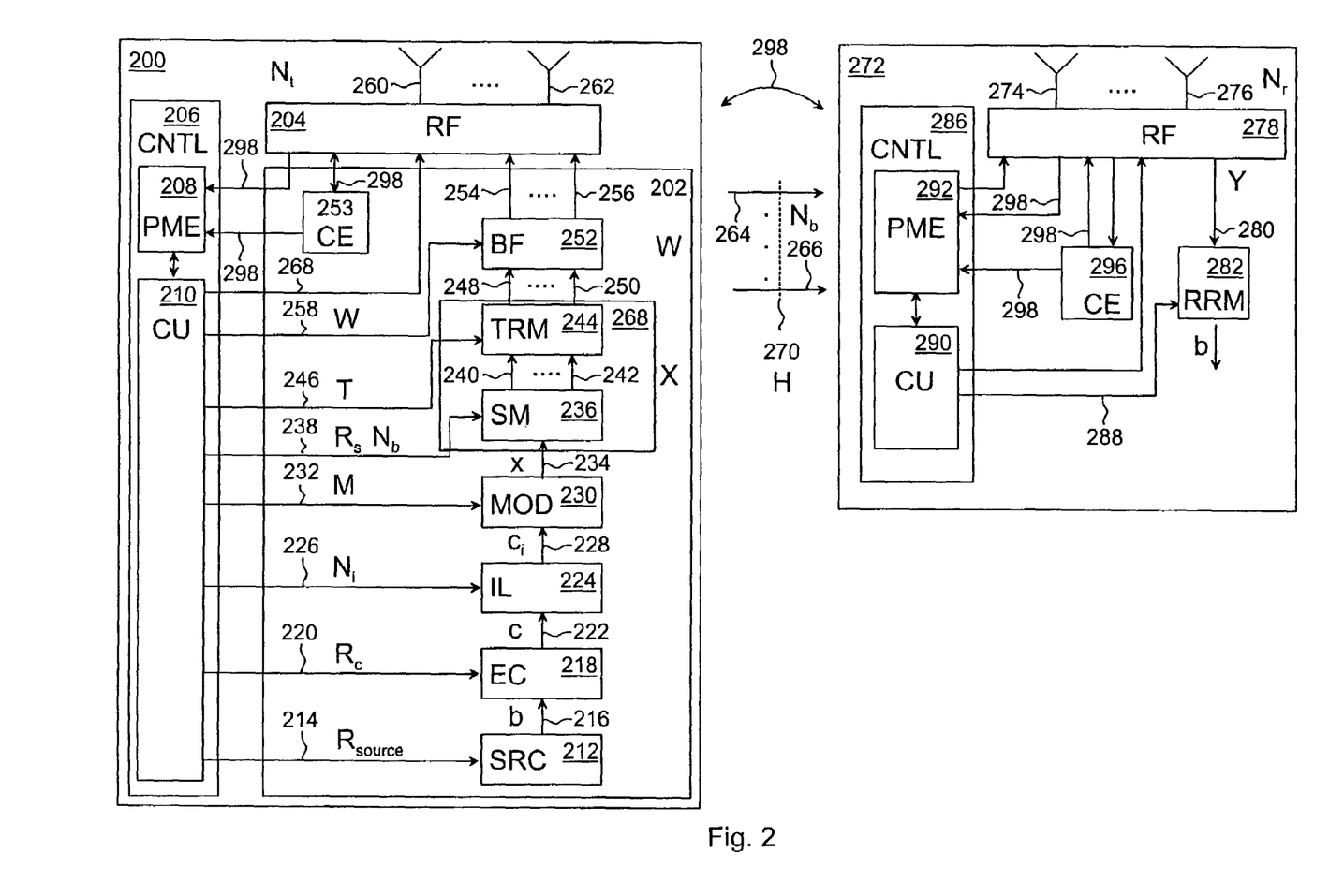
FIG. 2 shows an example of the structure of an arrangement for controlling communication resources according to one aspect of the invention.

FIG. 2 shows an example of a multi-antenna transmission chain for a stream of information bits 216 (b) from a first transceiver 200 to a second transceiver 272.

In one embodiment, the first transceiver 200 is a base station 142, 144, 152, 154, and the second transceiver 272 is a mobile station 170.

The exemplified first transceiver 200 includes a digital domain 202 and a radio frequency part 204. The digital domain 202 may include, for example, portions of a base band part of a base station 142, 144, 152, 154 and portions of a radio network controller 146, 156. The digital domain 202 may be implemented with digital processors, ASICs (Application Specific Integrated Circuit), and memory means.

The arrangement includes a controller, which may be a transmit controller 206 located in the first transceiver 200 and/or a receive controller 286 located in the second transceiver 272.

The transmit controller 206 may include a transmit performance measure estimator 208 and a transmit control unit 210. The transmit control unit 210 provides transmit resource control information for the first transceiver 200.

The receive controller 286 may include a receive performance measure estimator 292 and a receive control unit 290. The receive control unit 290 provides receive resource control information for the second transceiver 272.

In some embodiments, resource control information and performance measure information may be transferred between the transmit controller 206 and the receive controller 286 by using, for example, known signaling channels between the first transceiver 200 and the second transceiver 272. Therefore, the implementation and location of the performance measure estimators 208, 292 depends on the embodiment.

The controllers 206, 286 may be implemented with a digital computer and software. Some functionalities, however, may be implemented with ASIC.

The exemplified first transceiver 200 includes an encoding unit (EC) 218, which receives a stream of information bits 216 from an information source (SRC) 212. The information source 212 may be a digital processor of a digital domain, for example. The information source is provided with source information 214, such as source rate ($R_{source}$), by the transmit control unit 210. The source information 214 defines, for example, the bit rate at which the information source 212 outputs the stream of information bits 216 into the encoding unit 218. The information source 212 may also manage tasks such as scheduling and retransmission of the data packets according to the source information 214. Therefore, the source information may also include scheduling information, such as channel state related information such as channel quality, signal fading information, delay constraints or delay penalties for a given service, all of which affect the relative priority when allocating resources for different users and/or different services.

The scheduling may involve packet scheduling, which determines the order in which downlink transmissions for different users are transmitted, or more generally, the allocation of resources for different users. Resources may be defined as time-frequency-code slots, possibly combined with spatial resources such as transmit beams, beam indexes, transmit directions, sector index or indices. Time slot allocation can be used for prioritizing transmission for services, e.g. the user with best channel state (or channel-to-interference); this also applies to frequency and code resources.

The encoding unit 218 may encode the information bits 216 with codes, such as channelization codes and scrambling codes, and may provide a stream of coded bits (c) 222 for an interleaving unit (IL) 224. The encoding may or may not be specific to a communication channel between the first transceiver 200 and the second transceiver 272. The encoding is performed according to coding information 220 provided by the transmit control unit 210. The coding information 220 may include, for example, a code rate 220 characterizing the rate at which the information bits 216 are encoded. In addition, the coding information 220 may designate the encoding polynomials or encoder structure, selection of a coding method, and puncturing patterns for a selected coding method, for example.

The interleaving unit 224 may distribute the stream of coded bits 222 with interleaving information 226, such as an interleaving depth ($N_i$), over a predetermined time period, thus providing a stream of interleaved coded bits ($c_i$) 228 for a modulator unit 230. The interleaving information 226 characterizes the distribution of the stream of coded bits 222 in the predetermined time period, and is inputted into the interleaving unit 224 by the transmit control unit 210.

The interleaved coded bits 228 may be inputted into modulator unit (MOD) 230, which maps the interleaved coded bits 228 into a complex modulator vector (x) 234. The modulator unit 230 may be provided with modulation information 232 by the transmit control unit 210. The modulation information 232 characterizes the modulation, defining, for example, the number (M) of interleaved coded bits 228 mapped into a complex modulator vector 234. The combination of the modulation symbols allocated to a communication channel may be specific to the communication channel.

The complex modulator vector 234 may be outputted from the modulator unit 230 into a spatial modulator unit (SM) 236. The spatial modulator unit 236 maps the modulation symbols to a multi-dimensional matrix and outputs at least two parallel symbol streams 240, 242 to provide spatial modulation for the transmission. The parallel symbol streams 240, 242 may be modulated with independent or dependent modulation symbols. It is not compulsory to form two parallel symbol streams 240, 242, since all operations may be carried out with one stream only. In linear modulation, the parallel symbol streams 240, 242 are modulated with bit/symbol-index-specific basis matrices, which designate the mapping of each parallel symbol stream 240, 242 to transmission resources or antenna elements.

The spatial modulator unit 236 is provided with spatial modulation information 238, such as symbol rate $R_s$ designating the number of parallel symbol streams 240, 242, by the transmit control unit 210. The symbol rate $R_s$ characterizes the number of symbols allocated to or transmitted by each symbol time interval. In the simplest case, the symbol rate designates the number of independent symbols contained in the spatial modulation per a unit time. In one embodiment, the number of parallel symbol streams 240, 242 equals the number of radiation patterns 264, 266. In such a case, the first transceiver 200 transmits $N_b$ parallel communication streams from the transmit antenna elements 260, 262. In this context, an antenna element 260, 262 may also be a unit which includes a plurality of elementary antennas, such as directional or sectorized antennas.

The radiation patterns 264, 266 provide, together with the spatial modulation, efficient communication streams between the first transceiver 200 and the second transceiver 272. However, when the symbol rate is high, orthogonal transmission is not possible, and self-interference or co-channel interference similar to multi-user interference in CDMA or other multiple-access systems may occur between the symbols within the spatial modulation matrix, or the parallel symbol streams 240, 242.

In one embodiment of the invention, the parallel symbol streams 240, 242 are inputted to a transmit resource multiplexing unit (TRM) 244, which further distributes, allocates or maps the modulation symbols to transmit communication resources according to transmit resource multiplexing information 246 provided by the transmit control unit 210. The transmit resource multiplexing information 246 includes, for example, the number (T) of transmission communication resources allocated to the parallel symbol streams 240, 242. In addition, the transmit resource multiplexing information 246 may include information pertaining to multiplexing, such as channelization code information, carrier or sub-carrier frequencies, transmit power, and a radiation pattern or required coverage area information.

In an embodiment of the invention, the transmit communication resource unit 244 is capable of providing orthogonal transmission of the parallel bit streams 240, 242. The orthogonality of the transmission communication resources may, however, be controlled by the transmit resource control information.

The transmit resource multiplexing unit 244 outputs data streams 248, 250, or the elements of the symbol vector or matrix, into a beam forming unit 252, which distributes the data streams 248, 250 to the at least two radiation patterns 264, 266 provided by the transmit antenna elements 260, 262. The number of transmit antenna elements 260, 262 is denoted by $N_t$. In an embodiment, a radiation pattern 264, 266 is specific to a communication channel between the first transceiver 200 and the second transceiver 272.

The beam forming unit 252 is provided with beam forming information 258, such as complex antenna weights and the number $N_t$ of transmit antenna elements 260, 262 to be used in transmission, according to which the data streams 248, 250 are transmitted. The complex antenna weights may be represented by a weight matrix W. The number of radiation patterns 264, 266 is denoted by $N_b$. In an embodiment, a radiation pattern 264, 266 is an antenna beam. In some cases, the radiation patterns 264, 266 may be fully or partly predetermined. This is the case with a fixed-beam transmission, for example.

The radiation patterns 264, 266 may be separated from each other by code, by spatial properties, such as form and direction, and/or by electromagnetic properties, such as frequency and polarization.

The beam forming unit 252 outputs a plurality of transmit signals 254, 256 to the radio frequency part 204. The radio frequency part 204 may include a plurality of transmitters which are capable of processing the transmit signals 254, 256 such that each transmit signal 254, 256 may be transmitted to the at least two radiation patterns 264, 266. The processing includes digital-to-analogue conversion, up-conversion to a radio frequency, amplifying, and filtering.

The radio frequency part 204 is provided with a transmission information 268, such as power information, by the transmit control unit 210. The power information may control, for example, the transmit power with which the radiation patterns 260, 262 are transmitted.

For the ease of discussion, the functional entity, which includes the spatial modulator unit 236 and the transmit resource multiplexer 244, may be treated as a single multi-dimensional modulator unit 268, which distributes a sequence of $TR_s$ modulation symbols to $N_b$ radiation patterns 264, 266 provided by the transmit antenna elements 260, 262. In mathematical terms, the effect of the multi-dimensional modulator unit 268 on the interleaved coded symbols may be represented by a modulation matrix X.

It is noted that the invention is not restricted to the structure of the multi-antenna transmission chain described above, but may vary depending on the embodiment. For example, functionalities associated with the encoding unit 218, interleaving unit 224, and the modulator unit 230 may be performed in a combined unit, such as the multi-dimensional modulator unit 268. Furthermore, the order of the different elements may vary. For example, the interleaving unit 224 may be located between the beam forming unit 252 and the multi-dimensional modulator 268.

In one embodiment of the invention, the transmit communication resource includes a temporal transmit communication resource, such as symbol periods. In this case, the multi-dimensional modulator unit 268 acts like a space-time modulator applying e.g. space-time codes to the information bits 216. In space-time modulation $T \times R_s$ modulation symbols are distributed to $N_b$ radiation patterns during T symbol periods in order to provide transmission diversity and/or increased symbol rate. Distribution of the symbols across space and time dimensions provides spatial and time diversity. In the case of space-time coding, the transmit resource control information 246 includes matrix dimensions, such as the number of symbols, which may be embedded into the modulation matrix, bit-to-symbol mappings, relative and/or absolute transmit powers for different symbols or to spatial beam patterns.

A temporal resource may also include a scheduling resource, which includes scheduling of a transmission of a modulation matrix, for example, according to control information provided by the transmit control unit 210. In the case of scheduling, the control information may include information reflecting the relative or absolute service priorities or efficiencies of channels on which the services are to be transmitted, as well as possibly the corresponding required transmission resources, such as beam-patterns, or transmit powers, and transmissions rates.

A temporal resource may also include a re-transmission resource, which includes re-transmitting a portion of the stream of information bits 216 according to the control information provided by the transmit control unit 210.

In one implementation, the transmit communication resource includes a spectral transmit communication resource, such as a transmit carrier frequency. In this case, the multi-dimensional modulator unit 268 typically distributes $TR_s$ modulation symbols to $N_b$ radiation patterns 260, 262 using T different carrier frequencies. The corresponding coding scheme may be called space-frequency coding. The space-frequency coding may be implemented by inputting at least partly different bit streams, or symbol streams 240, 242, into separate transmitters which utilize at least two different carrier frequencies for at least two sub-streams or symbols. The different carrier frequencies may be generated in the radio frequency part 204 by means known to a person skilled in the art. The space-frequency coding provides spatial and frequency diversity.

In one embodiment, the transmit communication resource includes an encoding resource, such as spreading coding. In this case, the parallel symbol streams 240, 242 may be provided with different coding. The corresponding coding scheme may be called space-code coding.

The transmit communication resource includes a spatial transmit communication resource, such as the number of antenna $N_t$ elements 260, 262 used in transmission. The spatial transmit communication resource may also include the number $N_b$ of radiation patterns 264, 266 used in transmission.

The transmit communication resource includes transmit power with which the radiation patterns 260, 262 are transmitted.

It is noted that in some embodiments, the communication resources of different types may be combined in order to obtain an optimal performance of the telecommunications system. For example, temporal resources and spectral resources may be applied simultaneously, and a coding scheme may be selected accordingly.

With further reference to FIG. 2, the radiation patterns 264, 266 associated with the communication channels interact with the environment 270, which may affect on the spatial, temporal and spectral properties of the communication channels between the first transceiver 200 and the second transceiver 272.

The radiation patterns 264, 266 are spatially sampled by at least one receive antenna element 274, 276 of the second transceiver 272 and the resulting radio frequency antenna signal is inputted into a radio frequency part 278 of the second transceiver 272. In an embodiment, the second transceiver 272 includes $N_r$ receive antenna elements 274, 276, or receive radiation patterns, wherein $N_r > 1$. When $N_r > 1$, the second transceiver 272 acts like a MIMO receiver. The radio frequency part 278 converts the radio frequency antenna signal from each receive antenna element 274, 276 to a base band signal 280 e.g. by, filtering, down-converting, and digitizing. In this case, the plurality of receive signals is presented with a single reference numeral 280. The base band signal 280 is inputted into the receive communication resource unit 282, which in some embodiments outputs information bits for further processing.

The receive communication resource unit 282 includes receive communication resources which are controlled according to receive resource control information 288 provided by the receive control unit 290.

The receive communication resources may include receive processing power, a number of RAKE fingers, a number of parallel code channels, a number of carrier or sub-carrier frequencies supported by the receiver, a correlator, a matched filter, a channel equalizer, a channel decoder, a hard or soft output detector, an interference cancellator, a selection of a subset of receive antenna elements from $N_r$ antenna elements 274, 276.

The control of the receive resources may include
allocating a different number of RAKE fingers or sub-carriers a given service
selecting a channel equalizer type from a plurality of alternatives, such as a linear or a non-linear equalizer
selecting input and output sample rates from a plurality of different alternatives
modifying receive antenna coefficients associated with receive antenna beams
selecting the number of receive antenna beams.

Elements which are not controllable may exist in the receive communication resource unit 282. However, information on such elements may be included in the receive control information, and used as constraints when determining a performance measure for the communication channel. Such constraints may be, for example, the number of receive beam patterns, number of receive antennas 274, 276, carrier frequencies supported by the second transceiver 272.

The elements 212 to 262 in the first transceiver 200 compose a transmit portion of the communication channel. The elements 274 to 282 in the second transceiver compose a receive portion of the communication channel. Furthermore, the radio channel between the first transceiver 200 and the second transceiver 272 compose an air-interface portion of the communication channel. In a broad sense, the communication channel may be understood as a combination of transmission methods, reception methods, characteristics of the radio channel, characteristics of the hardware, and use of communication resources.

With further reference to FIG. 2, a communication channel between the first transceiver 200 and the second transceiver 272 may be characterized with a channel model:

$$\underset{T \times N_r}{Y} = \underset{T \times N_b}{X} \times \underset{N_b \times N_t}{W} \times \underset{N_t \times N_r}{H} - \underset{T \times N_r}{n} \quad (1)$$

wherein X is a modulation matrix characterizing the effect of the multi-dimensional modulator 268 on the interleaved coded bits 228, W is an antenna weight matrix representing the effect of the beam forming unit 252 on the data streams 248, 250, H is a channel matrix representing radio channel information between the first transceiver 200 and the second transceiver 272. The columns of the channel matrix H designate channel vectors from $N_t$ transmit antennas 260, 262 to $N_r$ receive antennas 274, 276. Furthermore, Y represents the received signal matrix, and n is a noise matrix characterizing the noise of the communication channel. In vector modulation, $N_b$ symbols are transmitted using 1 times $N_b$ dimensional vector X, i.e. T=1, whereas in matrix modulation T>1.

As an example of a conventional MIMO vector modulation model, consider ($N_t$, $N_r$)-MIMO system where K independent data streams denoted by a vector of size K×1 are transmitted through a flat Rayleigh fading and possibly correlated channel. Therefore, the received signal vector for $N_r$ antennas is given by:

$$y = W_{Rx} H W_{Tx} x + n, \quad (2)$$

where $W_{Tx}$ of size $N_t \times K$ and $W_{Rx}$ of size $N_r \times N_r$ are the transmit and receive beam forming matrices, respectively, with unit norm and orthogonal column vectors, H of size $N_r \times N_t$ is the impulse response of the channel with complex Gaussian entries having zero mean and unit variance, and n is additive white Gaussian noise with variance $N_0 = \sigma^2$ per complex entry. It is possible to set $W_{Rx} = I_{N_{Rx}}$, if an additional linear or non-linear receive processing is allowed. The transmit power may be different for different streams, i.e. different coordinates of the x vector. In this transmission method, the individual streams are linearly combined only via the channel coefficients within the physical channel matrix H, and possibly also with beam forming matrices. Each stream is transmitted only via one transmit beam, and the inter-stream interference depends primarily on the physical channel and the beam forming matrices.

As an example of the multi-dimensional modulation where at least symbol streams are transmitted via at least two beams, let us consider a modulation matrix which carries out an orthogonal or non-orthogonal modulation or coding for information symbols.

In an embodiment of the invention, the modulation matrix X includes at least one symbol which is transmitted using at least two antenna resources within at least two symbol time intervals. The modulation matrix X may include only one row for forming vector modulation, or a plurality of rows for forming matrix modulation. The symbol rate of the modulation may be greater than one. A symbol time interval is the time required for transmitting one row of the modulation matrix. The symbols within the modulation matrix may further be multiplied by additional multiplexing resources, such as spreading codes, carrier waveforms, sub-carrier waveforms, and the like. For example, each symbol may be multiplied with a different or the same spreading code. This increases the number of rows in a symbol matrix by a factor of N, where N is the length of the spreading code.

Various schemes may be applied to forming the modulation matrix. One solution is disclosed in U.S. Pat. No. 6,185,258 by Alamouti et al., which is hereby incorporated by reference. According to the above cited reference, the modulation matrix may be expressed as:

$$X_{Ala}(z_1, z_2) = \begin{bmatrix} z_1 & -z_2^* \\ z_2 & z_1^* \end{bmatrix}, \quad (3)$$

wherein each column includes symbols inputted to a transmit antenna, or a beam, and each row corresponds to a symbol period or a symbol interval.

The modulation matrix shown in equation (3) exemplifies a 2 by 2 space-time orthogonal block code. It employs two transmit antenna elements 260, 262 or beams during two symbol periods. The symbol rate is one, since two symbols are transmitted in two time slots. The code formed according to equation (3) is orthogonal in the sense that when multiplied together with its Hermitian transpose, a scaled identity matrix is obtained. The Hermitian transpose of a matrix A, denoted by $A^H$, is the complex conjugate transpose of A. The transpose of a matrix is derived by reversing the row and column indices of the matrix. The identity matrix, denoted by I, is a matrix with zero off-diagonal element and unity diagonal elements. Accordingly, for an orthogonal-based matrix A, it holds that $A^H A = A A^H = kI$, for some real value k. The orthogonality of the modulation matrix according to equation (3) enables separate decoding of the two symbols in such a way that that symbols do not interfere with each other.

The orthogonality requirement leads to modulation matrices which suffer from rate limitation problems, as taught in O. Tirkkonen and A. Hottinen, "Complex space-time block codes for four Tx antennas" in Proc. Globecom 2000, San Francisco, USA, November/December 2000, which is hereby incorporated by reference. As an example, the maximum symbol rate for an orthogonal transmit diversity code with four transmit antenna elements 260, 262 is ¾. When the rate loss is not allowed, the code orthogonality is sacrificed. As an example, O. Tirkkonen, A. Boariu, A. Hottinen, "Minimal Non-Orthogonality Rate 1 Space-Time Block Code for 3+ Tx Angennas," in Proc. IEEE ISSSTA 2000, September, NJ, USA, which is hereby incorporated by reference, presents one such method (e.g. the ABBA code). In this code the signal is transmitted by using the transmit diversity code matrix $$X_{NOBSTBC} = \begin{bmatrix} z_1 & -z_2^* & z_3 & -z_4^* \\ z_2 & z_1^* & z_4 & z_3^* \\ z_3 & -z_4^* & z_1 & -z_2^* \\ z_4 & z_3^* & z_2 & z_1^* \end{bmatrix}. \quad (4)$$

The code described above yields good performance in a fading channel. However, due to the non-orthogonality, there is an inherent performance loss unless a receiver signal processing algorithm, an equalizer, detector, or other receiving element is able to tackle non-orthogonal correlating symbol streams. A maximum likelihood detector, posed to deliver a posteriori probabilities for each symbol or bit within each symbol yields acceptable desired performance, whereas linear receivers, such as those applying MMSE principle may induce a performance loss. Soft outputs, such a posteriori probabilities, are typically forwarded to a channel decoder, in the presence of a concatenated encoding chain.

Even higher symbol rates may be needed in future communication systems. When the symbol rate is increased to two, a number of solutions exist, as is understood from the following examples. The symbol rate two matrix modulation may be based on schemes such as double space-time transmit diversity (DSTTD) coding or double ABBA (DABBA) coding, for example. The invention is not, however, restricted to the afore-mentioned methods, but may be applied to any modulation method wherein modulation symbols are distributed to a plurality of transmit antenna elements and transmit beams.

In the DSTTD coding, two space-time transmit diversity (STTD) codes are transmitted from four transmit antenna elements 260, 262 using modulation matrix:

$$X(x_1, \ldots, x_4) = [X(x_1, x_2) X(x_3, x_4)], \quad (5)$$

wherein $x_1, \ldots x_4$ are modulation symbols, and $X(x_1, x_2)$ and $X(x_3, x_4)$ are sub-orthogonal space-time block coded sub-matrices of the modulation matrix. In this case, the number of $x_1, \ldots x_4$ symbols is 4 and the symbol rate $R_s$ is 2. The modulation symbols $x_1, \ldots x_4$ may be arbitrary, e.g. quadratic phase shift keying symbols, for example.

The modulation matrix may also be formed by linearly pre-coding a vector of at least two input symbols, by multiplying the vector with a linear, preferably unitary transformation, and distributing the output of the transformation over at least two symbol intervals and over at least two transmit antennas. Similarly, the pre-coded symbols may be input to STTD, ABBA, DSTTD, or DABBA, other any orthogonal or non-orthogonal modulation matrix.

To understand the effect of the selected matrix modulation on receiver operations, consider an extended channel model corresponding to equation (1). The extended channel model may be expressed in terms of extended channel matrix $H_e$, wherein the symbols in the modulation matrix and the channel matrix H are written in an alternative order in order to formulate a signal model which is linear in symbols or bits. In the case of parallel transmission according to model (1x), such a linear model is natural. In this case, the adaptation and resource control algorithms may operate naturally based on channel matrix H, whereas with more efficient modulation matrices, the physical channel matrix gives only partial information on performance. An extended channel model, described below, is in these cases different from the physical channel model.

In a vector presentation, using an extended channel model, we obtain:

$$y = H_e x + n, \quad (6)$$

wherein y is a column vector of the receive signal matrix Y, and x is a complex modulator vector 234. The extended matrix $H_e$ requires further explanation, as it depends on the symbol matrix X.

As an example of the relationship between the channel model shown in equation (1) and that shown in equation (6), let us assume that in the first transceiver 200 $N_t=2$, and in the second transceiver $N_r=1$, corresponding to a case wherein two transmit antenna elements 260, 262 and one receive antenna 274, 276 are used, the beam forming matrix W is a unit matrix, and the modulation matrix of equation (3) is applied. In this case the received signal vector y is of the form:

$$y = \frac{1}{\sqrt{2}} X h + n = \frac{1}{\sqrt{2}} \begin{bmatrix} x_1 h_1 + x_2 h_2 \\ x_1^* h_2 - x_2^* h_1 \end{bmatrix} - n \quad (7)$$

wherein $h_1$ and $h_2$ are the channel coefficient of the channel matrix H characterizing the radio channel between the two transmit antenna elements 260, 262 and the one receive antenna element 274, 276. In the notation adopted, a* is a complex conjugate of a, wherein a=x. By conjugating the received signal vector y during the second symbol period, the received signal may be expressed in terms of the channel model:

$$\begin{bmatrix} y_1 \\ y_2^* \end{bmatrix} = H_e \begin{bmatrix} x_1 \\ x_2 \end{bmatrix} + n, \quad (8)$$

wherein the extended channel matrix $H_e$ may be written as $$H_e = \frac{1}{\sqrt{2}} \begin{bmatrix} h_1 & h_2 \\ h_2^* & -h_1^* \end{bmatrix}. \quad (9)$$

It can be seen that the matrix in equation (9) shows the structure of the code matrix, and is fundamentally a different matrix from that of the actual channel matrix H. It can be seen that even with two transmit antennas, and one receive antenna, the extended matrix has dimensions 2 by 2, whereas with the same antenna configuration the physical channel matrix has dimensions 1 by 2 only. Nevertheless, the extended channel matrix may be formed at the receiver provided that both the channel matrix H and the structure of code X are known.

The extended channel matrix may be formed in a similar fashion for other symbol matrices. Also in these cases, the extended channel model has dimensions larger than the physical channel matrix, and it provides a significantly improved model for performance assessment.

For DSTTD, the related extended channel matrix may be written as:

$$H_e = [H_{e,1} H_{e,2}], \quad (10)$$

where:

$$H_{e,1} = H_e(h_1, h_2), \quad (11)$$

and $$H_{e,2} = H_e(h_3, h_4) \quad (12)$$

In this example, $H_e$ follows the structure in equation (9), with channel coefficients relating to different transmit antenna elements 260, 262, as shown in the arguments. It us usual that multiple receive antenna elements 274, 276 are needed, in which case additional matrices may be concatenated below matrix $H_e$. Similarly, the model dimensions increase, if the receiver samples the received signal more frequently in the time domain (multiple samples per spreading code chip or symbol interval), or if there are multiple (matched) filters in the receiver.

In terms of the extended matrix notation, a receive filtering matrix L in the second transceiver 272 may take the form:

$$L = (H_e^* H_e + \sigma^2 I)^{-1} H_e, \quad (13)$$

wherein $H_e^*$ is a Hermitian transpose of $H_e$, $\sigma^2$ is a noise power and I is an identity matrix. It is clear that the receive filtering matrix depends on the modulation matrix via the extended channel model. After filtering, the symbol decision is based on the relation:

$$z_k = L_l^* y, \quad (14)$$

wherein $L^*_k$ is a MMSE (Minimal Mean Square Estimate) receive filter for the $k^{th}$ stream obtained as a Hermitian transpose of $L_k$, and $z_k$ is a linear estimate of the symbols $x_1$ and $x_2$. The formulation in equations (13) and (14) assumes that the form of the extended channel matrix $H_e$ is known at a sufficient accuracy. The above extended channel matrix is orthogonal, for example in a flat fading channel when orthogonal space-time codes are used in the transmitter. However, with high rate modulation matrices it may become non-orthogonal. As stated above, with DSTTD, the number of columns in $H_e$ matrix is doubled, and the modulation matrix X, like the extended channel matrix, is non-orthogonal. In this case, different receivers may have significantly different performance, depending on receive capability and applied receiver algorithms.

The channel models shown in the above equations characterize the communication channels including modulation, wherein modulation symbols are distributed to a plurality of radiation patterns 264, 266. In turn, a communication channel carries characteristics represented by a channel model.

The performance measure characterizes the performance of the communication channel between the first transceiver 200 and the second transceiver 272. The performance measure is sensitive to the spatial modulation. Since the communication channel may be formed using various transmission methods including scheduling, coding, interleaving, modulation, and weighting, the performance measure of a communication channel characterizes the various transmission and/or reception methods. Thereby, the performance measure may be used in evaluating or assessing the performance of feasible transmission and/or reception methods if the effect of the radio channel is taken into account. Since the transmission methods and possibly the reception methods characterize how communication resources are used, the performance measure also characterizes the different uses of the communication resources.

In one embodiment of the invention, the performance measure characterizes a bit-error rate (BER). In mathematical terms, the average bit-error rate $P_b$ over K symbols may be expressed for linear receivers with BPSK modulation in AWGN (Additive White Gaussian Noise) as:

$$P_b = \frac{1}{K} \sum_k^K Q\left(\frac{\beta_k}{\sqrt{1+\lambda_k^2}}\right), \quad (15)$$

wherein K is the number of parallel communication streams and Q denotes the complementary error function. Furthermore:

$$\beta_k = \frac{a_k (\overline{L^* R})_{k,k}}{\sigma \sqrt{(\overline{L^* R L})_{k,k}}}, \quad (16)$$

wherein $a_k$ is a transmit power of a parallel communication stream k, $\overline{L}_*$ is a Hermitian transpose of linear filter matrix, and $\overline{R}$ is an extended correlation matrix $R = H_e^* H_e$. Furthermore, $$\lambda_k^2 = \frac{\beta_k^2 \sum_{j \neq k} \gamma_{k,j}^2}{\gamma_{k,k}^2}, \quad \text{wherein} \quad (17)$$

$$\gamma_{k,j} = a_j (\overline{L^* R})_{k,j}. \quad (18)$$

The ratio $\gamma_{k,j}/\gamma_{k,k}$ occurring in the summation in equation (17) characterizes an interference between $k^{th}$ and $j^{th}$ parallel communication channels in the extended channel model.

As above, a modulation matrix X generally leads to a different extended channel matrix $H_e$. Thereby, it is clear from the above equations that the bit-error rate is sensitive to the spatial modulation via modulation matrix X, and thus characterizes a communication channel such that the performance of the communication channel may be accounted for. The actual performance measure changes when a modulation alphabet is changed. For example, 4QAM and 16QAM constellations have different formulas. If the channel is fading or changing, the performance measure may reflect this by averaging over the fading distribution, which sometimes leads to simple closed-form performance expressions, as is known in the art. Also, the real BPSK model may be used to characterize a QPSK model when the I and Q components are appropriately interpreted as two-dimensional real components. For the extended channel matrix $H_e$ and the extended channel correlation matrix, these read as $H_e^{real} = [\text{Real}(H_e) \text{ Imag}(H_e); -\text{Imag}(H_e) \text{ Real}(H_e)]$, and $R_e^{real} = [\text{Real}(R_e) \text{ Imag}(R_e); -\text{Imag}(R_e) \text{ Real}(R_e)]$, respectively, where it is assumed that $H_e$ and $R_e$ are complex valued matrices, and Real(m) and Imag(m) extract the real and imaginary parts of a matrix element m, respectively.

The performance measure presented above is only an example. Not only does it change with different modulation alternatives, but it is also possible to use only selected function arguments from the above equation, such as $\beta_k$ and/or $\gamma_k$ to simplify the calculation. The $\beta_k$ and $\gamma_k$ parameters reflect signal-to-noise ratio estimates for each of the k streams when using the given receiver filter matrix L. Furthermore, the use of communication channel specific performance measures may be preferred when the transmission of parallel communication channels may be controlled separately. The performance measure may also depend e.g. on the interference power, measured at a terminal, or the self-interference power which is exhibited in powers of off-diagonal terms in the correlation matrix. In the latter case, the off-diagonal terms may be further multiplied by a factor between 0 and 1 when calculating the performance measure. Such a factor may model a receiver capability in suppressing (inter-stream) interference. A linear receiver may have a factor of 0.5, whereas a maximum likelihood receiver may have a factor of 0.1, thus modeling a case wherein an average 90% of the interference is suppressed. Any of these measures may be used in conjunction with, for example, interference power measurements. Also, measures related to the eigenvalues, or a minimum distance between two signal states (known as asymptotic efficiency in multi-user detection literature), computable using the correlation matrix and signal alphabets, may be used. The prior art solutions do not take into account the structure extended code matrix when estimating performance.

In one embodiment, the performance measure is calculated before channel decoding. With a channel decoder, such as a convolutional, Turbo, concatenated, concatenated parity check codes, the possible performance measures are a frame-error rate (FER), for example, which characterizes the quality of the communication channel at a frame level. FER may be estimated using error-detection codes, such as a CRC code (Cyclic Redundancy Check). A performance measure may also reflect information pertaining to the mapping from one performance measure, such as that obtained from a signal before channel decoder, to another obtained from a signal after the channel decoder. This mapping may reflect the target performance, such as SIR level calculated using a selected performance measure before the channel decoder required to obtain a target FER. Here, the symbol level processing when receiving data may or may not be identical to that used when calculating the performance measure. For example, the receiver may contain a non-linear maximum likelihood detector, but a performance measure may be calculated as if a linear receiver were used. In such a case, the threshold performance measure is only an approximation.

The performance measure reflects the properties of the transmission symbol matrix, but may be only an approximation to the receiver operations. Similarly, the channel properties, such as the number of delay paths, their impulse response, or statistical model, may only be approximated when calculating the performance measure. In multi-carrier systems, the performance measure may be combination of performance measures in each individual sub-carrier, for example, as weighted sum, such as an arithmetic mean, or as a weighted product, such as a geometric mean. The weighted form may be different for different encoding schemes or encoding rates.

The transmit resource control information, such as the source information 214, the coding information 220, interleaving information 226, modulation information 232, spatial modulation information 238, transmit resource multiplexing information 246, beam forming information 258, and transmission information 268, is formed at least partially based on the performance measure. The transmit control information may be formed at the receiver using the performance measure, and signaled to the transmitter, or the transmitter may be provided with information pertaining to the performance measure, and the transmitter forms the resource control information. Any combination of these two cases is also possible. Furthermore, the receive resource control information 288 may also be formed using the performance measure.

In an embodiment, the communication resources are adapted to instantaneous requirements, such as link level or system level requirements, using the performance measure. The adaptation may include using adaptive modulation schemes, adaptive scheduling, adaptive beam forming and adaptive power control. The combination of transmitting and/or receiving may also be adapted. The performance measure may be evaluated for each of the different alternatives. For example, the extended channel matrix may be calculated for two feasible beam forming solutions, and the one yielding the better performance may be selected. Naturally, any adaptive transmission method may be evaluated, as long as the extended channel matrix can be computed. Other methods may be used to reduce the number of alternative extended channel models, and the method of the invention is then applied only to the reduced model set. For example, the number of transmit beams, or the symbol rate, may be roughly determined by using the physical channel model H only, while selecting the transmission symbol matrix, or the beam coefficients or powers may be determined using the improved performance measures using the extended channel model. A part of the transmission model may be optimized also with continuous more effective optimization techniques, such as linear or non-linear programming.

The following example depicts an example of operations when the second transmitter 272 is a mobile station (MS).

1. The MS calculates a transmit beam forming matrix $W=[w_1, w_2, \ldots, w_N]$:
   a. The MS calculates a channel estimate $h_m$ of $m^{th}$ antenna
   b. The MS calculates correlation matrix R using channel estimates from each antenna with integration over P channel estimates, wherein the correlation matrix and the channel estimate may be exemplified as:

$R=1/P\Sigma H_p^H H_p,$ $H_p=[h_1^p \ldots h^p{}_M] \in C^{L \times M};$ c. The MS calculates eigenvectors $w_i$ ($i=1, \ldots, N_b$) for the $N_b$ largest eigenvalues of the aggregate correlation matrix.
2. Evaluating the extended channel model:
   a. The MS calculates the effective channels using eigenvectors of the physical channel, or their approximations exemplified by;

$h_{1,eff}=H_p^H w_1,$ $h_{2,eff}=H_p^H w_2,$ b. The MS uses the effective communication channels (in place of physical channels) in forming the extended channel matrix for at least two different modulation matrices;
   c. The MS determines the performance measures for the at least two modulation matrices;
   d. The MS selects desired transmission resources, such as e.g. one modulation matrix, channel coding and symbol modulation information, beam coefficients, and signals the related information to the transmitter;
3. Transmitter uses the signaled information in transmission to the MS.

Different variations of the above example may also exist. For example, the eigenvectors $w_i$ may be replaced by a fixed set of possible beams, using e.g. a Fourier matrix, or some conventional beams parameterization, for example one based on direction of arrival or transmission parameters, and the transmission beams may be selected as a subset of all possible beams.

Furthermore, the model may be evaluated for a different number of parallel beams, or matrices of different symbol rate, or both, and the one that maximized a given performance measure, e.g. throughput may be selected.

Also, there may be a number of users, using different set of antennas located in different spatial locations, each user operating as above, the transmitter determining the allocation of resources depending on the performance measures, or transmission resources suggested by each user. In this case, the actual transmission resources allocated to any given user may be different from what the user signaled to the transmitter. The transmitter may, for example, try to guarantee a minimum throughput for each user, and to obtain this, it may have to priorities a user that does not have the highest instantaneous performance measure.

In one embodiment of the invention, the performance measure is determined by using a channel model, such as that including the extended channel matrix $H_e$, characterizing the communication channel. The channel model may be constructed by using a priori information, such as antenna weights, modulation information, and radio channel information, on the communication channel. Examples of channel models and performance measures are given in the above equations. The channel information may be obtained by a measurement or blind channel estimation methods. In terms of the extended channel matrix, the invention is based on the fact that different transmission/reception methods lead to different extended channel matrices, and thus different performance of the communication channel.

The radio channel information 298 may be determined by a channel estimator 253, 296. The radio channel information 298 determination may be based on performing impulse response measurements on predetermined symbol sequences transmitted between the transmit antenna elements 260, 262 and the receive antenna elements, 274, 276.

The channel information may also be obtained using channel prediction if the channel varies in time and an estimate of the channel for some future time instant is used when evaluating the performance measure. Channel prediction is a well-known method, so it is not described here in more detail.

The predetermined symbol sequences may be transmitted by using orthogonal antenna configurations, for example. The predetermined symbol sequences may be pilot sequences transmitted on pilot channels, such as common pilot channels. It is known to a person skilled in the art how the radio channel is estimated when $N_t$ transmit antenna elements and $N_r$ receive antenna elements are used. It is noted that in some cases, only a portion of the radio channel information suffices for the determination of the performance measure. Such a portion may be a sub-matrix, a column, a row or an individual element of the channel matrix H.

In one embodiment, the channel estimator 296 is located in the first transceiver 200. In such a case, the second transceiver 272 generates predetermined symbol sequences which are transmitted by the transmit antenna elements 260, 262 and received by the receive antenna elements 274, 276. This embodiment may be used in TDD systems (Time Division Duplex), wherein the same frequency bands are used both on the uplink and the downlink.

In another embodiment, the channel estimator 253 is located in the first transceiver 200. In such a case, the second transceiver 272 generates predetermined pilot sequences and transmits them using the receive antenna elements 274, 276. The predetermined symbol sequences are received by the transmit antenna elements 260, 262 and delivered to the channel estimator 252. This embodiment may be used in FDD systems (Frequency Division Duplex), wherein different frequency bands are used on the downlink and the uplink.

The radio channel information 298 is delivered to the performance measure estimator 208, 292, which computes a performance measure for the communication channel. The performance measure may be computed by using closed form expressions, such as those shown in equations (15) to (18). It is also possible to approximate the performance measure with a simpler quantity, and use e.g. mapping between an accurate performance measure and an approximation.

In one embodiment, the control unit 210, 290 includes the resource control information and inputs resource control information into the performance measure estimator 208, 292. The performance measure estimator 208, 292 computes the performance measure for the communication channel using the resource control information and the radio channel information formed by the channel estimator 253, 296. The performance measure estimator 208, 292 may then return the value of the performance measure to the control unit 210, 290, which makes an assessment for the communication resource control based on the performance measure.

Signal statistics of a received signal is used in characterizing the performance measure. The second transceiver 272 may, for example, determine a time evolution of an SINR (signal-to-noise-ratio) of the communication channel in order to assess the error probability of the communication channel. The error probability may be used in selecting, for example, an appropriate space-time modulation scheme.

The control unit 210, 209 performs a comparison between the performance measure and a target value of the performance measure and controls the communication resources based on the comparison. The target value may define, for example, desired capacity of the communication channel. If the performance measure matches the target value at desired accuracy, the transmission and/or reception method corresponding to the communication channel may be selected thus to correspond to the resource control information. If the performance measure does not match the target value, the control unit 210, 290 may input new resource control information into the performance measure estimator 208, 292, which determines the performance measure for the communication channel corresponding to the new resource control information. The determination of the performance measure for different communication channels may be repeated until the computed performance measure matches with the target value at a desired accuracy.

In one implementation, the transmission between the first transceiver 200 and the second transceiver 272 is interrupted if a performance measure does not exceed the target value, thus releasing communication resources for other users. The procedure for determining the performance measure and comparing the obtained performance measure with the target value may be continued. Alternatively, the transmission resources may be modified so that a target value is met. The target value may be calculated in the receiver so that a given performance outage is maintained. This can be done by maintaining statistics of previous performance values, and selecting a threshold that is supported at a sufficient rate, such as 70% of time. Alternatively, the network may signal the target or threshold value to the receiver.

In an embodiment, the performance measure estimator 208, 292 determines performance measures for a plurality of communication channels between the first transceiver 200 and the second transceiver 272. The radio channel information, i.e. the channel matrix H may or may not remain unchanged when determining the performance measures. The communication channels utilize different transmission and/or reception methods, thus leading to different performance measures which characterize the performance of the system if the specific transmission and/or reception method were used. The performance measure estimator 208, 292 may, for example, estimate the bit-error rate, or its parameter, for a plurality of transmission and/or reception methods, and the obtained bit-error rate estimates may be used in controlling the communication resources. The communication resources may be controlled, for example, by selecting the transmission and/or reception method from the group of methods the performance measures were determined for. The transmission and/or reception method yielding the smallest bit-error rate with a given transmit power, for example, may be used for the actual transmission.

Now consider a case wherein communication resources are controlled by selecting a suitable modulation matrix, which corresponds to selecting a suitable symbol or data rate. The performance measures for three communication channels corresponding set of parameters:
1. $N_t=4$, $N_r=2$, Rs=1, ABBA with 16 QAM (Quadrature Amplitude Modulation) symbol constellations
2. $N_t=4$, $N_r=2$, Rs=2, Double STTD
3. $N_t=4$, $N_r=2$, Rs=1, 16QAM using one dominant eigenbeam are determined. Here, each alternative from 1, 2 and 3 obtains the same spectral efficiency, namely 4 bits per channel used. The communication resource control may be performed by selecting the set of parameters yielding the best performance measure. In such a case, the performance measures may be determined in the first transceiver 200 or in the second transceiver 272. If the alternative transmission methods have different rates, the associated performance measure may take this into account e.g. by determining throughput as a function of the performance measure. The throughput estimate may be calculated by multiplying the data rate of the considered transmission method by the related BER or FER estimate. For example, the method that provides higher throughput with the same transmit power is preferred.

In another example, the number of transmit antennas $N_t$ and the symbol rate $R_s$ are fixed. The DABBA (Double ABBA) modulation scheme may be used. In such a case, the second transceiver 272 may determine the performance measures for different linear combinations of the receive antenna configurations. In this case, the different linear combinations of the receive antenna elements may lead to different beams 264, 266 and thus to different extended channel matrices. The performance measures may then be compared and the most favorable receive antenna weighting may be realized. In this embodiment, the second transceiver 272 is capable of obtaining selection type diversity for MIMO modulation and simplifying receive processing. This operation also allows a smaller number of analog signal processing components to be utilized in the second transceiver 272. The minimum number of analog radio frequency components is the same as the number of the receive antennas in the selected subset, rather than the number of receive antennas 274, 276.

Figure 3:
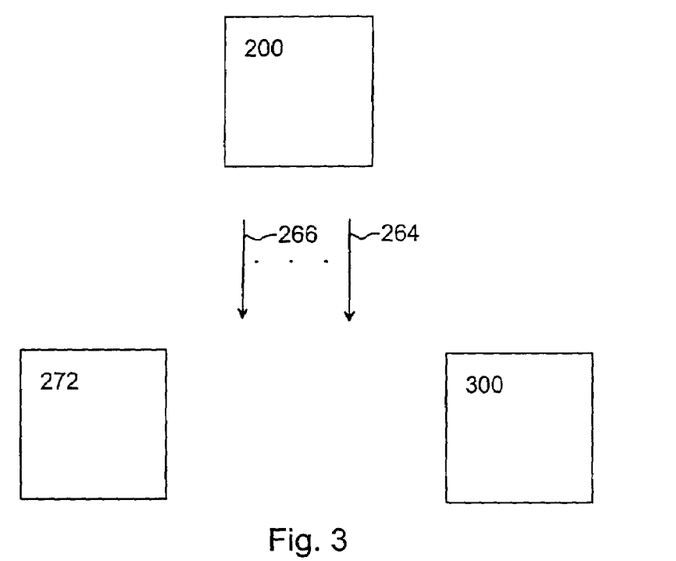
FIG. 3 shows an exemplary embodiment of a telecommunications system.

In one embodiment, the performance measure estimator 208, 292 further determines a performance measure for a communication channel between the first transceiver 272 and a third transceiver 300 (FIG. 3). The structure of the third transceiver 300 may be similar to the exemplified structure of the second transceiver 272.

The performance measure for the communication channel between the first transceiver 200 and the third transceiver 300 may be determined in a similar manner to the performance measure for the communication channel between the first transceiver 200 and the second transceiver 272. It is clear to a person skilled in the art how to apply those teachings to the third transceiver case.

The performance measure for the communication channel between the first transceiver 200 and the second transceiver 272 and the performance measure for the communication channel between the first transceiver 200 and the third transceiver 300 may be compared and the communication resources may be allocated or prioritized to the second transceiver 272 or the third transceiver 300 based on the performance measure. This case corresponds to a multi-user case.

In a multi-user case, the two communication channels involve different channel matrices H and possibly different receive communication resource constraints. Therefore, the performance measures are chosen so that they are comparable with each other at a desired accuracy. In the multi-user case, the performance measure may be the required transmit power to attain a given performance measure, achievable BER/FER/SIR with given transmit power, data rate, and/or antenna weighting, attainable performance or rate increase achievable by controlling the transmit communication resource setting by a fixed amount.

As an example of a multi-user case, consider an open-loop multi-user case with four users with equal channel statistics. The modulation matrix X may be fixed to DABBA form and the beam forming matrix may be an identity matrix, or another fixed matrix. In this example, the second transceiver 272 and the third transceiver 300 determine $\beta_k$ of their own shown in equation (16) and signal quantized $\beta_k$ values to the first transceiver 200. Now, $\beta_k$ represents a performance measure. The first transceiver 200 may control the communication resources by allocating all or most of the transmit communication resources to the transceiver which had the largest $\beta_k$.

In another example, a closed-loop case is considered. In this case, the second transceiver 272 and the third transceiver 300 determines W matrix as two dominant eigenbeams of the channel matrix H, or the approximation of the eigenbeams, and signals the associated antenna or eigenbeam approximation weights along with the associated $\beta_k$ parameters or other performance measures to the first transceiver 200. The first transceiver 200 allocates more resources to a transceiver 272, 300 with larger $\beta$, and uses the associated beam forming coefficients in transmission. It is noted that different receivers may calculate a performance measure using a different algorithm. If this measure is not FER, the performance measure should preferably be such that a given initial performance measure beta guarantees some predefined FER with sufficient reliability.

Figure 4:
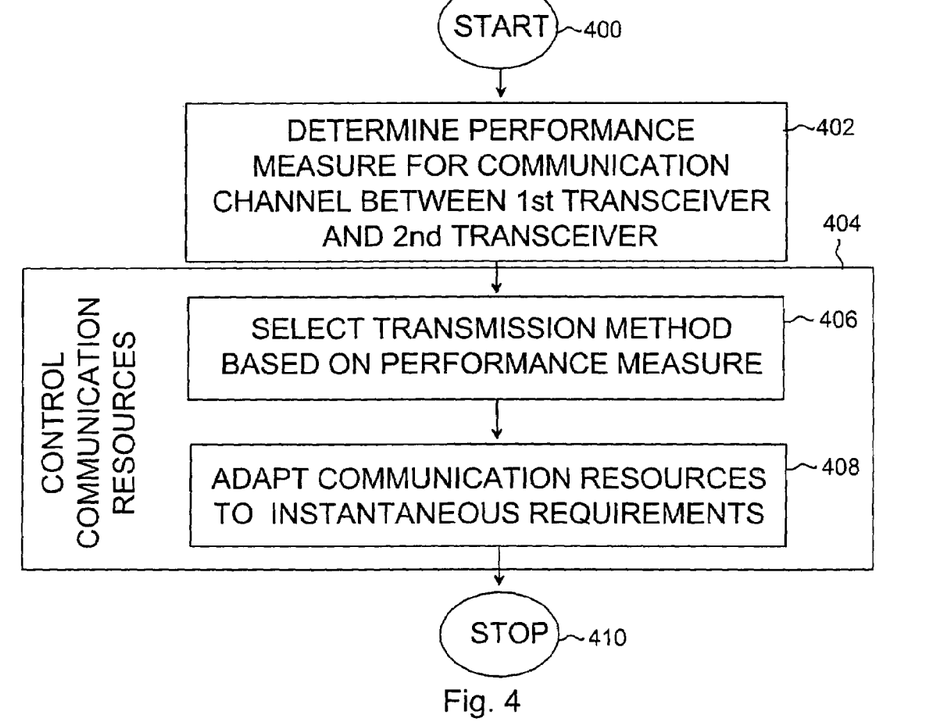
FIG. 4 shows a first example of the methodology used by the system according to various embodiments of the invention.
Figure 5:
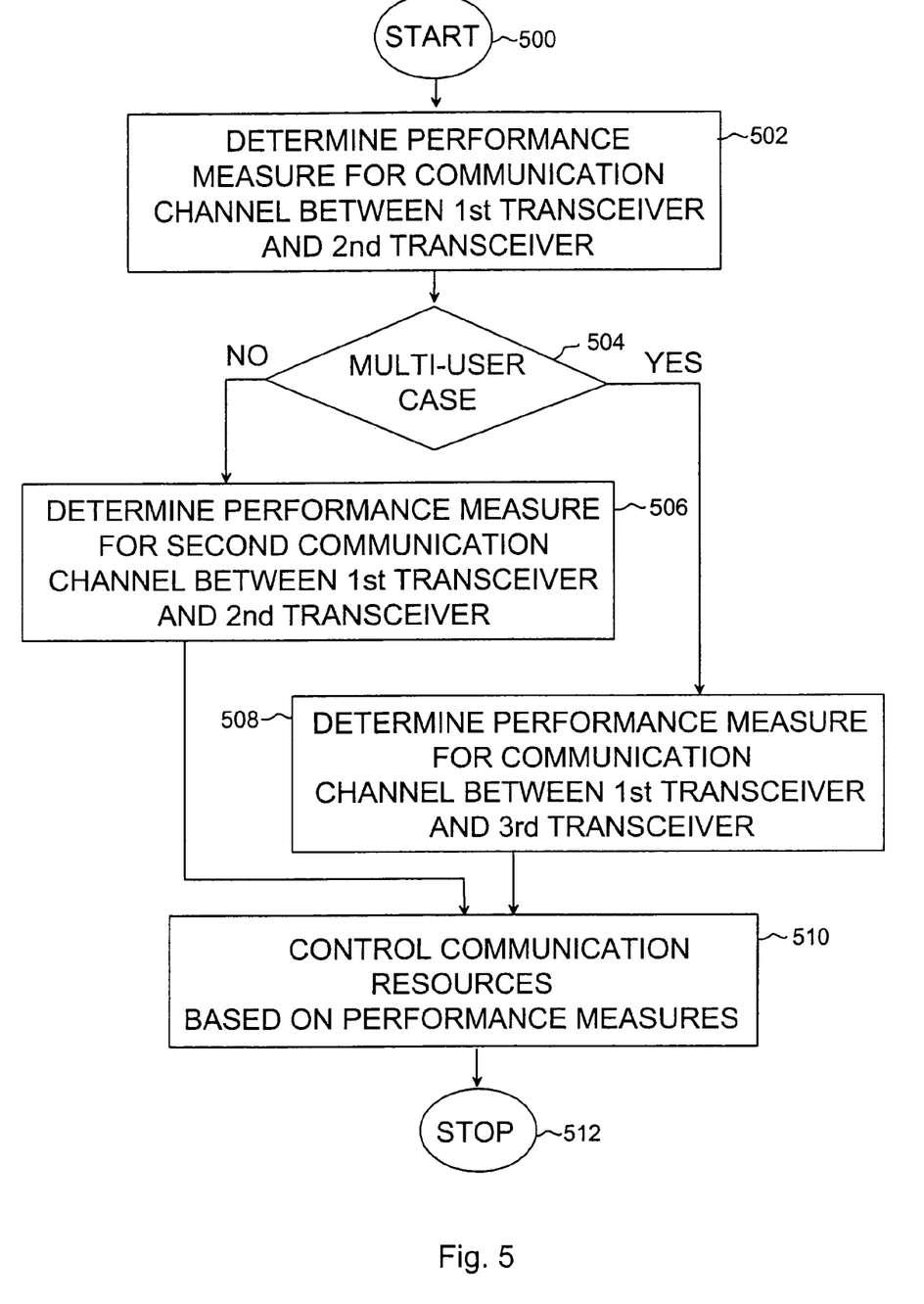
FIG. 5 shows a second example of the methodology used by the system according to various embodiments of the invention.

With reference to FIGS. 4 and 5, examples of the methodology used by the system according to embodiments of the invention are shown.

In FIG. 4, the method starts 400 and a performance measure for a communication channel between the first transceiver 200 and the second transceiver 272 is determined 402. In step 404, the communication resources are controlled based on the performance measure. The transmission method is selected 406 based on the performance measure and the communication resources are adapted 408 to instantaneous requirements. The method is stopped at 410.

In FIG. 5, the method starts 500 and a performance measure for a communication channel between the first transceiver 200 and the second transceiver 272 is determined 502. A single-user case or a multi-user case is selected 504 and corresponding to the single-user case, a performance measure for a second communication channel between the first transceiver 200 and the second transceiver 272 is determined 506. This corresponds to the embodiment wherein a plurality of performance measures are determined for a plurality of communication channels between the first transceiver 200 and the second transceiver 272. When selection 504 corresponds to the multi-user case, a performance measure for a communication channel between the first transceiver 200 and a third transceiver 300 is determined 508. The communication resources are controlled 510 based on the performance measures and the method is stopped 512.

Even though the invention has been described above with reference to an example according to the accompanying drawings, it is clear that the invention is not restricted thereto but can be modified in several ways within the scope of the appended claims.

The invention claimed is:

1. A method, comprising:
   determining a performance measure representing communication performance in a communication channel between a first transceiver and a second transceiver in a telecommunication system by using an extended channel model which depends on a non-orthogonal modulation matrix, wherein non-orthogonal modulation by the non-orthogonal modulation matrix is comprised in the extended channel model, wherein modulation symbols in the non-orthogonal modulation matrix are distributed using at least two radiation patterns, the performance measure being sensitive to a change in spatial modulation through the extended channel model, the spatial modulation being used by the non-orthogonal modulation matrix; and
   controlling the communication resources based on the performance measure.

2. The method of claim 1, further comprising:
   determining a plurality of performance measures for at least two different non-orthogonal modulation matrices before controlling the communication resources; and
   selecting communication resources associated with a non-orthogonal modulation matrix yielding a better performance measure.

3. The method of claim 1, further comprising:
   determining a second performance measure for a second communication channel between the first transceiver and a third transceiver; and
   controlling the communication resources based on the determined performance measures.

4. The method of claim 1, further comprising:
   determining the performance measure by using a channel model which represents the communication channel between the first transceiver and the second transceiver.

5. The method of claim 1, wherein the modulation matrix comprises at least one symbol which is transmitted using at least two antenna resources within at least two symbol time intervals.

6. The method of claim 1, wherein the modulation matrix comprises at least one element of one row for forming a vector modulation, a plurality of rows for forming matrix modulation, a symbol rate greater than one, a row having a dimension greater than that of a channel matrix, a column having a dimension greater than that of the channel matrix, effect of spreading, effect of carrier, effect of waveform, and effect of channelization codes.

7. The method of claim 1, further comprising:
   determining the performance measure using at least one channel information on a radio channel associated with the communication channel, antenna weights associated with the communication channel, and modulation information on the communication channel.

8. The method of claim 1, wherein the performance measure comprises at least one element selected from frame-error rate, bit-error rate, signal-to-noise ratio, signal-to-interference ratio, asymptotic efficiency, throughput, interference power, and noise power.

9. The method of claim 1, further comprising:
   selecting a transmission method based on the performance measure.

10. The method of claim 1, wherein controlling the communication resources is based on comparison between a target value and the performance measure.

11. The method of claim 1, further comprising:
    configuring the communication resources to instantaneous requirements based on the performance measure.

12. The method of claim 1, wherein the communication channel further comprises at least one of interleaving, spreading, carrier waveform, sub-carrier waveform, channel encoding, matrix modulation, vector modulation, multiple-input multiple output modulation, space-time coding, space-frequency coding, space-code coding, beam forming, multibeam forming, radio channel, channel decoding, detection, equalizing, rake reception, and filtering of a received signal.

13. The method of claim 1, wherein the communication resources comprise a transmit communication resource comprising at least one of a temporal transmit communication resource, a spectral transmit communication resource, an encoding resource, a spatial transmit communication resource, and transmit power.

14. The method of claim 1, wherein the communication resources comprise receive communication resources.

15. An apparatus, comprising:
    a determiner configured to determine a performance measure representing communication performance in a communication channel between a first transceiver and a second transceiver in a telecommunications system by using an extended channel model which depends on a non-orthogonal modulation matrix, wherein non-orthogonal modulation by the non-orthogonal modulation matrix is composed in the extended channel model, wherein modulation symbols in the non-orthogonal modulation matrix are distributed using at least two radiation patterns, the performance measure being sensitive to a change in spatial modulation through the extended channel model, the spatial modulation being used by the non-orthogonal modulation matrix; and
    a controller configured to control the communication resources based on the performance measure.

16. The apparatus of claim 15, further comprising:
    a determiner configured to determine a plurality of performance measures for at least two different non-orthogonal modulation matrices before controlling the communication resources, and wherein the controller is configured to select communication resources associated with a non-orthogonal modulation matrix yielding a better performance measure.

17. The apparatus of claim 15, further: comprising:
    a determiner configured to determine a second performance measure for a second communication channel between the first transceiver and a third transceiver.

18. The apparatus of claim 15, further comprising:
    a determiner configured to determine the performance measure by using a channel model which represents the communication channel between the first transceiver and the second transceiver.

19. The apparatus of claim 15, wherein the modulation matrix comprises at least one symbol which is transmitted using at least two antenna resources within at least two symbol time intervals.

20. The apparatus of claim 15, wherein the modulation matrix comprises at least one of one row for forming vector modulation, a plurality of rows for forming matrix modulation, a symbol rate greater than one, a row having a dimension greater than that of a channel matrix, a column with a dimension greater than that of a channel matrix, effect of spreading, effect of carrier, effect of waveform, and effect of channelization codes.

21. The apparatus of claim 15, wherein the determiner is configured to use at least one of channel information on a radio channel associated with the communication channel, antenna weights associated with the communication channel, and modulation information on the communication channel.

22. The apparatus of claim 15, wherein determiner is configured to represent at least one of a frame-error rate of the communication channel, bit-error rate, signal-to-noise ratio, signal-to-interference ratio, asymptotic efficiency, throughput, interference power, and noise power.

23. The apparatus of claim 15, further comprising:
a selector configured to select a transmission method based on the performance measure.

24. The apparatus of claim 15, wherein the controller is configured to control communication resources based on comparison of a target value and the performance measure.

25. The apparatus of claim 15, further comprising:
an adapter configured to adapt the communication resources to instantaneous requirements based on the performance measure.

26. The apparatus of claim 15, wherein the communication channel further comprises at least one of interleaving, spreading, carrier waveform, sub-carrier waveform, channel encoding, matrix modulation, vector modulation, multiple-input multiple output modulation, space-time coding, space-frequency coding, space-code coding, beam forming, multi-beam forming, radio channel, channel decoding, detection, equalizing, rake reception, and filtering of received signal.

27. The apparatus of claim 15, wherein the communication resources include a transmit communication resource of at least one of a temporal transmit communication resource, a spectral transmit communication resource, an encoding resource, a spatial transmit communication resource, and transmit power.

28. The apparatus of claim 15, wherein the communication resources include receive communication resources.

29. An apparatus, comprising:
a performance measure estimator configured to determine a performance measure that represents communication performance in a communication channel between a first transceiver and a second transceiver by using an extended channel model which depends on a non-orthogonal modulation matrix,
wherein the non-orthogonal modulation by the non-orthogonal modulation matrix is comprised in the extended channel model,
wherein modulation symbols in the non-orthogonal modulation matrix are distributed using at least two radiation patterns, and wherein the performance measure is sensitive to a change in spatial modulation through the extended channel model, the spatial modulation being used by the non-orthogonal modulation matrix; and
a controller connected to the performance measure estimator, the controller being configured to control the communication resources based on the performance measure.

30. The apparatus of claim 29, wherein the performance measure estimator is configured to determine a plurality of performance measures for at least two different non-orthogonal modulation matrices before controlling the communication resources, and wherein the controller is configured to select communication resources associated with a non-orthogonal modulation matrix yielding a better performance measure.

31. The apparatus of claim 29, wherein the performance measure estimator is configured to determine a second performance measure for a second communication channel between the first transceiver and a third transceiver; and
wherein the controller is configured to control the communication resources based on the determined performance measures.

32. The apparatus of claim 29, wherein the performance measure estimator is configured to determine the performance measure by using a channel model which represents the communication channel.

33. The apparatus of claim 29, wherein the modulation matrix comprises at least one symbol which is transmitted using at least two antenna resources within at least two symbol time intervals.

34. The apparatus of claim 29, wherein the modulation matrix comprises at least one of one row for forming a vector modulation, a plurality of rows for forming a matrix modulation, a symbol rate greater than one, a row having a dimension greater than that of a channel matrix, a column having a dimension greater than that of the channel matrix, effect of spreading, effect of carrier, effect of waveform, and effect of channelization codes.

35. The apparatus of claim 29, wherein the performance measure estimator is configured to determine the performance measure using at least one of channel information on a radio channel associated with the communication channel, antenna weights associated with the communication channel, and modulation information on the communication channel.

36. The apparatus of claim 29, wherein the performance measure is configured to represent at least one of frame-error rate of the communication channel, bit-error rate, signal-to-noise ratio, and signal-to-interference ratio.

37. The apparatus of claim 29, wherein the controller is configured to select a transmission method based on the performance measure.

38. The apparatus of claim 29, wherein the controller is configured to control communication resources based on comparison between a target value and the performance measure.

39. The apparatus of claim 29, wherein the controller is configured to adapt the communication resources to instantaneous requirements based on the performance measure.

40. The apparatus of claim 29, wherein the communication channel further comprises at least one of interleaving, spreading, carrier waveform, sub-carrier waveform, channel encoding, matrix modulation, vector modulation, multiple-input multiple output modulation, space-time coding, space-frequency coding, space-code coding, beam forming, multi-beam forming, radio channel, channel decoding, detection, equalizing, rake reception, and filtering of a received signal.

41. The apparatus of claim 29, wherein the communication resources comprise a transmit communication resource of at least one of a temporal transmit communication resource, a spectral transmit communication resource, an encoding resource, a spatial transmit communication resource, and transmit power.

42. The apparatus of claim 29, wherein the communication resources include receive communication resources.

43. An apparatus, comprising:
means for determining a performance measure representing communication performance in a communication channel between a first transceiver and a second transceiver by using an extended channel model which depends on a non-orthogonal modulation matrix, wherein non-orthogonal modulation by the non-orthogonal modulation matrix is comprised in the extended channel model, wherein modulation symbols in the non-orthogonal modulation matrix are distributed using at least two radiation patterns, the performance measure being sensitive to a change in spatial modulation through the extended channel model, the spatial modulation being used by the non-orthogonal modulation matrix; and means for controlling the communication resources based on the performance measure.

44. The method of claim 1, further comprising determining the performance measure by using a receive filter matrix which depends on a non-orthogonal matrix via the extended channel model.

45. The apparatus of claim 15, wherein the determiner is configured to determine the performance measure by using a receive filter matrix which depends on a non-orthogonal matrix via the extended channel model.

46. The apparatus of claim 29, wherein the performance measure estimator is configured to determine the performance measure by using a receive filter matrix which depends on a non-orthogonal matrix via the extended channel model.

47. An apparatus, comprising:
 a performance measure estimator configured to determine a performance measure that represents communication performance in a communication channel between a base station and a mobile station by using an extended channel model which depends on a non-orthogonal modulation matrix, wherein non-orthogonal modulation by the non-orthogonal modulation matrix is comprised in the extended channel model, wherein modulation symbols in the non-orthogonal modulation matrix are distributed using at least two radiation patterns, and wherein the performance measure is sensitive to a change in spatial modulation through the extended channel model, the spatial modulation being used by the non-orthogonal modulation matrix; and
 a radio frequency part configured to transmit the determined performance measure to the base station for controlling communication resources.

48. An apparatus, comprising:
 a controller configured to
 receive a performance measure that represents communication performance in a communication channel between a first transceiver and a second transceiver by using an extended channel model which depends on a non-orthogonal modulation matrix, wherein non-orthogonal modulation by the non-orthogonal modulation matrix is comprised in the extended channel model, wherein modulation symbols in the non-orthogonal modulation matrix are distributed using at least two radiation patterns, and wherein the performance measure is sensitive to a change in spatial modulation through the extended channel model, the spatial modulation being used by the non-orthogonal modulation matrix, and
 control communication resources based on the received performance measure.

* * * * *